US012756219B2

(12) United States Patent
Kim

(10) Patent No.: US 12,756,219 B2
(45) Date of Patent: Oct. 6, 2026

(54) ENERGY STORAGE SYSTEM AND CONTROL METHOD OF ENERGY STORAGE SYSTEM

(71) Applicant: LG ENERGY SOLUTION, LTD., Seoul (KR)

(72) Inventor: Jongcheol Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 869 days.

(21) Appl. No.: 18/024,203

(22) PCT Filed: Jul. 26, 2022

(86) PCT No.: PCT/KR2022/010931
§ 371 (c)(1),
(2) Date: Mar. 1, 2023

(87) PCT Pub. No.: WO2023/008867
PCT Pub. Date: Feb. 2, 2023

(65) Prior Publication Data

US 2023/0268754 A1 Aug. 24, 2023

(30) Foreign Application Priority Data

Jul. 26, 2021 (KR) ........................ 10-2021-0097480

(51) Int. Cl.
*H02J 7/90* (2026.01)
*H02J 7/82* (2026.01)

(52) U.S. Cl.
CPC ................ *H02J 7/933* (2026.01); *H02J 7/82* (2026.01); *H02J 2207/20* (2020.01)

(58) Field of Classification Search
CPC ........................................................ H02J 7/933
(Continued)

(56) References Cited

U.S. PATENT DOCUMENTS

2010/0065349 A1 3/2010 Ichikawa et al.
2011/0140535 A1 6/2011 Choi et al.
(Continued)

FOREIGN PATENT DOCUMENTS

CN 109309396 A * 2/2019 .............. H02J 7/865
CN 110048513 A * 7/2019 .............. H02J 15/00
(Continued)

OTHER PUBLICATIONS

International Search Report (with translation) and Written Opinion dated Nov. 25, 2022, issued in corresponding International Patent Application No. PCT/KR2022/010931.
(Continued)

*Primary Examiner* — Jerry D Robbins
(74) *Attorney, Agent, or Firm* — Morgan, Lewis & Bockius LLP

(57) ABSTRACT

An energy storage system may comprise: a plurality of power converters configured to perform DC/DC conversion in connection with respective battery racks; a power conversion system (PCS) configured to perform power conversion between the power converters and a power grid; and a battery section controller interworking with the plurality of power converters and the power conversion system, wherein the battery section controller is configured to control a first power converter among the plurality of power converters to perform constant voltage (CV) mode control for maintaining a voltage of a DC link at a constant level, to check a state of a first battery rack to which the first power converter is connected, and to change a subject to perform the CV mode control for the DC link according to the state of the first battery rack.

20 Claims, 3 Drawing Sheets

(58) Field of Classification Search
USPC .......................................................... 320/132
See application file for complete search history.

(56) References Cited

U.S. PATENT DOCUMENTS

| | | | | |
|---|---|---|---|---|
| 2011/0215649 | A1 | 9/2011 | Min et al. | |
| 2013/0181519 | A1 | 7/2013 | Lee | |
| 2013/0234669 | A1 | 9/2013 | Huang et al. | |
| 2014/0340044 | A1* | 11/2014 | Kim .......................... | H02J 7/54 320/134 |
| 2015/0270732 | A1 | 9/2015 | Park | |
| 2016/0226268 | A1 | 8/2016 | Okui | |
| 2017/0104359 | A1 | 4/2017 | Jung et al. | |
| 2017/0126043 | A1 | 5/2017 | Yoshida et al. | |
| 2018/0145600 | A1 | 5/2018 | Zhou et al. | |
| 2020/0195148 | A1 | 6/2020 | Wen et al. | |
| 2020/0280191 | A1 | 9/2020 | Lee | |
| 2022/0052600 | A1 | 2/2022 | Kong et al. | |

FOREIGN PATENT DOCUMENTS

| | | | | | |
|---|---|---|---|---|---|
| CN | 111095717 | A | | 5/2020 | |
| CN | 112865154 | A | * | 5/2021 | ................ H02J 7/52 |
| EP | 2117106 | A1 | | 11/2009 | |
| JP | 2008-187884 | A | | 8/2008 | |
| JP | 2014-131413 | A | | 7/2014 | |
| JP | 2019-030110 | A | | 2/2019 | |
| KR | 10-2011-0068690 | A | | 6/2011 | |
| KR | 10-2011-0099499 | A | | 9/2011 | |
| KR | 10-2013-0047197 | A | | 5/2013 | |
| KR | 10-2013-0099022 | A | | 9/2013 | |
| KR | 10-1312177 | B1 | | 9/2013 | |
| KR | 10-2015-0078009 | A | | 7/2015 | |
| KR | 10-2015-0109769 | A | | 10/2015 | |
| KR | 10-2016-0094228 | A | | 8/2016 | |
| KR | 10-2017-0041448 | A | | 4/2017 | |
| KR | 10-2018-0090673 | A | | 8/2018 | |
| KR | 20180090673 | A | * | 8/2018 | .............. H02J 3/382 |
| KR | 101923515 | B1 | * | 11/2018 | ......... G01R 31/3835 |
| KR | 10-2019087 | B1 | | 9/2019 | |
| KR | 10-2020-0003586 | A | | 1/2020 | |
| KR | 10-2020-0007603 | A | | 1/2020 | |
| KR | 10-2020-0031413 | A | | 3/2020 | |
| WO | 2015/147171 | A1 | | 10/2015 | |
| WO | 2018/034711 | A2 | | 2/2018 | |

OTHER PUBLICATIONS

Office Action dated Mar. 25, 2024 issued in corresponding Japanese Patent Application No. 2023-518865 (machine translation included).

Office Action dated Apr. 29, 2026 issued in corresponding Chinese Patent Application No. 202280005895.0 (with English translation). (Note: KR 10-2018-0090673 A and KR 10-2013-0099022 A cited in this CN Office Action have already been cited in a prior IDS.).

* cited by examiner

ENERGY STORAGE SYSTEM AND CONTROL METHOD OF ENERGY STORAGE SYSTEM

TECHNICAL FIELD

This application claims priority to and the benefit of Korean Patent Application No. 10-2021-0097480 filed in the Korean Intellectual Property Office on Jul. 26, 2021, the entire contents of which are incorporated herein by reference.

The present invention relates to an energy storage system and a method of controlling the same, and more particularly, to an energy storage system including a plurality of power converters and a method of controlling the energy storage system.

BACKGROUND ART

An energy storage system relates to renewable energy, a battery that stores electric power, and grid power. Recently, as the spread of smart grid and renewable energy is expanding and the efficiency and the stability of the power system are emphasized, a demand for energy storage systems for power supply and demand control and power quality improvement is increasing. Depending on a purpose of use, energy storage systems may have different output and capacity. In order to configure a large-capacity energy storage system, a plurality of battery systems may be connected. These energy storage systems are changing to DC-coupled energy storage systems.

An energy storage system may include a battery section with a plurality of batteries, a battery management system (BMS), a power conversion system (PCS), and an energy management system (EMS). A DC-coupled energy storage system may further require DC/DC converters.

Meanwhile, in an ESS system using a separate DC/DC converter for each battery, a method of calculating an output value of each battery at every moment through a central controller and transmitting the value as a command to each battery is generally used. However, in this instance, any appropriate solution is not presented as to how to maintain a system voltage.

SUMMARY

Technical Problem

To obviate one or more problems described above, an object of the present disclosure is to provide a control method of an energy storage system.

Another object of the present disclosure for obviating one or more problems described above is to provide an energy storage system.

Yet another object of the present disclosure for obviating one or more problems described above is to provide a battery section control apparatus.

Technical Solution

According to another embodiment of the present disclosure, a control method of an energy storage system including a plurality of battery racks and a plurality of power converters respectively connected to the plurality of battery racks, the method comprises: controlling a first power converter among the plurality of power converters to perform constant voltage (CV) mode control for maintaining a voltage of a DC link at a constant level; checking a state of a first battery rack to which the first power converter is connected; and changing a subject to perform CV mode control for the DC link according to the state of the first battery rack.

Here, the DC link is a link between the plurality of power converters and a power conversion system (PCS) that is configured to perform AC/DC conversion between the plurality of power converters and a power grid.

The control method may further comprise controlling the other power converters except the first power converter among the plurality of power converters to perform constant power (CP) mode control or constant current (CC) mode control.

The changing a subject to perform CV mode control for the DC link may include stopping the first power converter performing DC link control and controlling a second power converter among the plurality of power converters to perform DC link control based on a state of charge (SOC) of the first battery rack.

The changing a subject to perform CV mode control for the DC link further may include controlling the DC link control by the first power converter and the DC link control by the second power converter to be simultaneously performed temporarily, before the DC-link control only by the second power converter is started.

Here, a power converter among the plurality of power converters except for the first power converter may be chosen as the second power converter to perform DC link control instead of the first power converter, wherein the second power converter corresponds to a battery rack with a value of an intermediate position in terms of state of charges of the battery racks.

The checking a state of a first battery rack may include determining whether a state of charge of the first battery rack has reached an upper limit or a lower limit of a preset range of state of charge.

In order to achieve the objective of the present disclosure, an energy storage system may comprise: a plurality of power converters configured to perform DC/DC conversion in connection with respective battery racks; a power conversion system (PCS) configured to perform power conversion between the power converters and a power grid; and a battery section controller interworking with the plurality of power converters and the power conversion system, wherein the battery section controller is configured to control a first power converter among the plurality of power converters to perform constant voltage (CV) mode control for maintaining a voltage of a DC link at a constant level, to check a state of a first battery rack to which the first power converter is connected, and to change a subject to perform the CV mode control for the DC link according to the state of the first battery rack.

Here, the battery section controller may be configured to control the other power converters except the first power converter among the plurality of power converters to perform constant power (CP) mode control or constant current (CC) mode control.

The battery section controller may be configured to stop the first power converter performing DC link control and to control a second power converter among the plurality of power converters to perform DC link control based on the state of charge (SOC) of the first battery rack.

Furthermore, the battery section controller may be configured to control the DC link control by the first power converter and the DC link control by the second power converter to be simultaneously performed temporarily, before the DC-link control only by the second power converter is started.

The battery section controller may also be configured to select a power converter among the plurality of power converters except for the first power converter as the second power converter to perform DC link control instead of the first power converter, wherein the second power converter corresponds to a battery rack with a value of an intermediate position in terms of state of charges of the battery racks.

The battery section controller may also be configured to determine whether a state of charge of the first battery rack has reached an upper limit or a lower limit of a preset range of SOC and decide whether to change the subject to perform CV mode control for the DC link.

According to another embodiment of the present disclosure, a battery section controller in an energy storage system including a plurality of battery racks and a plurality of power converters respectively connected to the plurality of battery racks, wherein the battery section controller is in connection with the plurality of power converters, the battery section controller may comprise: at least one processor; and a memory configured to store at least one instruction executed by the at least one processor; wherein the at least one instruction includes: an instruction to control a first power converter among the plurality of power converters to perform constant voltage (CV) mode control for maintaining a voltage of a DC link at a constant level; an instruction to check a state of a first battery rack to which the first power converter is connected; and an instruction to change a subject to perform CV mode control for the DC link according to the state of the first battery rack.

Here, the at least one instruction further may include controlling the other power converters except the first power converter among the plurality of power converters to perform constant power (CP) mode control or constant current (CC) mode control.

Advantageous Effects

According to the embodiments of the present invention as described above, it is possible to stably control a DC link voltage in an energy storage system using a plurality of DC/DC converters.

In addition, since the rest of the DC/DC converters other than the DC/DC converter performing CV control use CP control or CC control, a battery section controller can actively calculate an output reference for each battery considering a state of each battery.

Furthermore, a power control system can also perform CP control as an existing way without an additional procedure, such as a software change, thereby performing grid-linked control smoothly.

DETAILED DESCRIPTION

Figure 1:
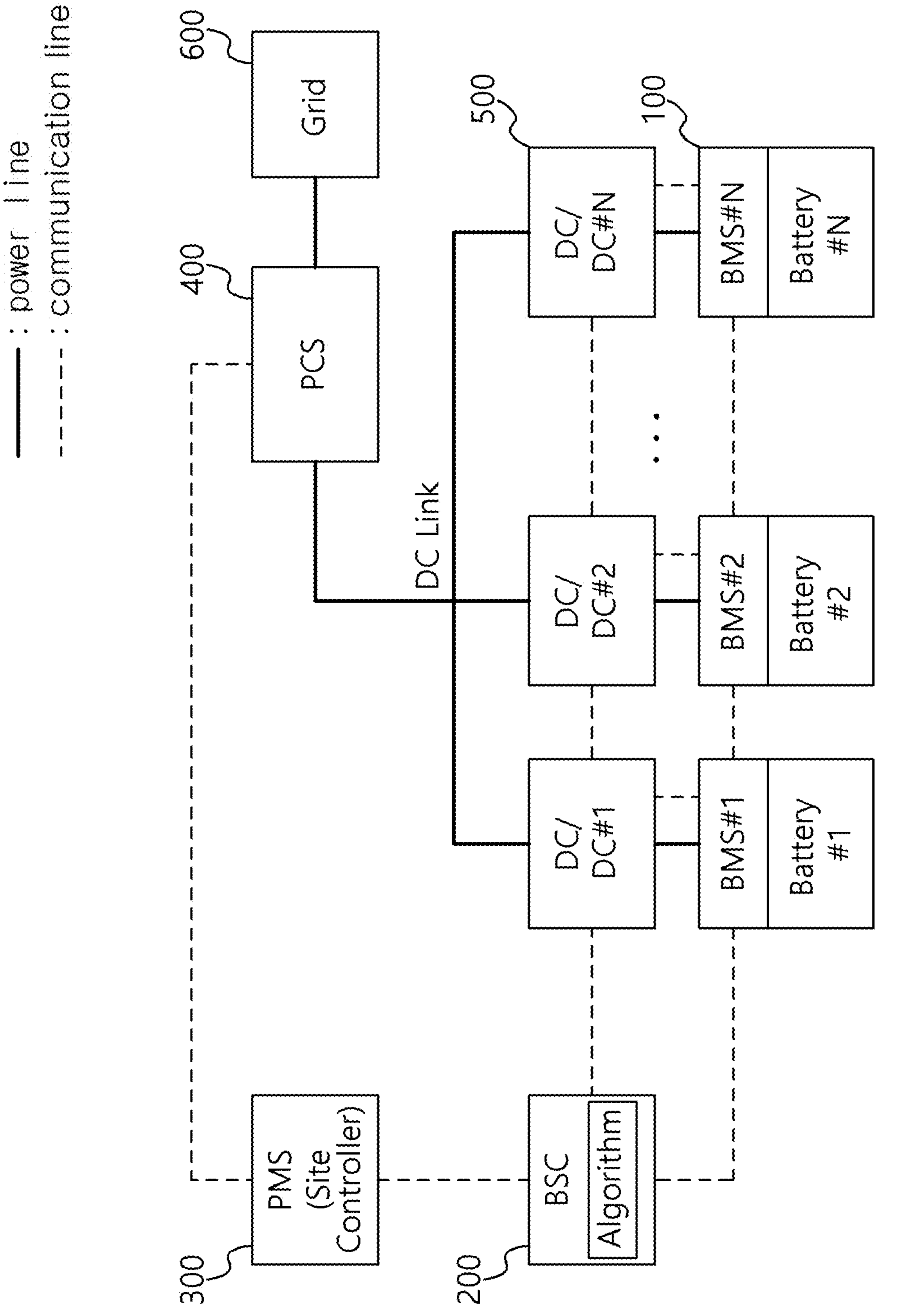
FIG. 1 is a block diagram of an energy storage system to which the present invention may be applied.

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings.

The present invention proposes a solution for how to maintain a system voltage in an energy storage system including DC/DC converters, in particular, a control method of the energy storage system.

FIG. 1 is a block diagram of an energy storage system to which the present invention may be applied.

In an energy storage system (ESS), a battery is used for storing energy or power. Typically, multiple battery modules may form a battery rack and multiple battery racks form a battery bank. Here, depending on a device or a system in which the battery is used, a battery rack may be referred to as a battery pack. Battery #1, battery #2, . . . , and battery #N shown in FIG. 1 may each be in a form of a battery pack or a battery rack.

Referring to FIG. 1, a battery management system (BMS) 100 may be installed for each battery. The BMS 100 may monitor a current, a voltage and a temperature of each battery pack (or rack) to be managed, calculate a state Of charge (SOC) of the battery based on a monitoring result to control charging and discharging.

A battery section controller (BSC) 200 may be located in each battery section which includes a plurality of batteries, peripheral circuits, and devices to monitor and control objects such as a voltage, a current, a temperature, and a circuit breaker. Furthermore, the BSC 200 may calculate an output of each DC/DC converter based on the monitored state information of the battery and transmit the calculated output of DC/DC converter to the DC/DC converter.

According to embodiments of the present invention, the battery section controller may interwork with a plurality of power converters in an energy storage system including a plurality of battery racks and a plurality of power converters respectively connected to the plurality of battery racks. The battery section controller may comprise at least one processor; and a memory configured to store at least one instruction executed by the at least one processor.

The at least one instruction includes an instruction to control a first power converter among the plurality of power converters to perform constant voltage (CV) mode control for maintaining a voltage of a DC link at a constant level; an instruction to check a state of a first battery rack to which the first power converter is connected; and an instruction to change a subject to perform CV mode control for the DC link according to the state of the first battery rack.

In addition, the at least one instruction may further include controlling the other power converters except the first power converter among the plurality of power converters to perform constant power (CP) mode control or constant current (CC) mode control.

A power conversion system (PCS) 400 installed in each battery section may control power supplied from the outside and power supplied from the battery section to the outside, thereby controlling charging and discharging of the battery. The power conversion system may include a DC/AC inverter. In other words, the power conversion system may convert the output of the battery (that is, DC power) into AC power and transmit it to the grid (during discharging), or in reverse, converting AC power from the grid into DC power and transferring it to the battery (during charging).

The output of the DC-DC converter 500 may be connected to the PCS 400 and the PCS 400 may be connected to the power grid 600. Here, the PCS 400 typically operates in a constant power mode. A power management system (PMS) 300 connected to the PCS may control outputs of the PCS based on the monitoring and control results of the battery management system or the battery section controller.

In the energy storage system of FIG. 1, battery #1 is connected to DC-DC converter #1, battery #2 is connected to DC-DC converter #2, and battery #N is connected to DC-DC #N. The output of the DC-DC converter corresponding to each battery is connected to the PCS 400 through a DC link.

The DC-DC converter may be a bidirectional converter, wherein when conversion is performed from the battery to the load direction, the input of the DC-DC converter is connected to a battery (a battery unit, a battery rack or a battery pack) and the output of the DC-DC converter may be connected to a load. As examples of the DC-DC converter, various types of converters such as a full-bridge converter, a half-bridge converter, and a flyback converter may be used.

Meanwhile, communication among the BMS 100, the BSC 200, the PMS 300, and the PCS 400 may be implemented through a controller area network (CAN) or Ethernet (indicated by a dotted line in FIG. 1).

In such an ESS system as described above, a central controller in the system generally calculates an output value of a battery every moment, and transmits the calculated value as a command to each battery (high level control). However, the high level control is possible only when a system voltage of the energy system is maintained, that is, a low level control needs to be preceded.

Referring to FIG. 1, a DC link, which is a region between the DC/DC converter and the PCS, has a DC voltage, and the voltage of the DC link may be generally referred to as a system voltage. For stability of the energy storage system as a whole, the system voltage needs to be maintained within a constant level.

Figure 2:
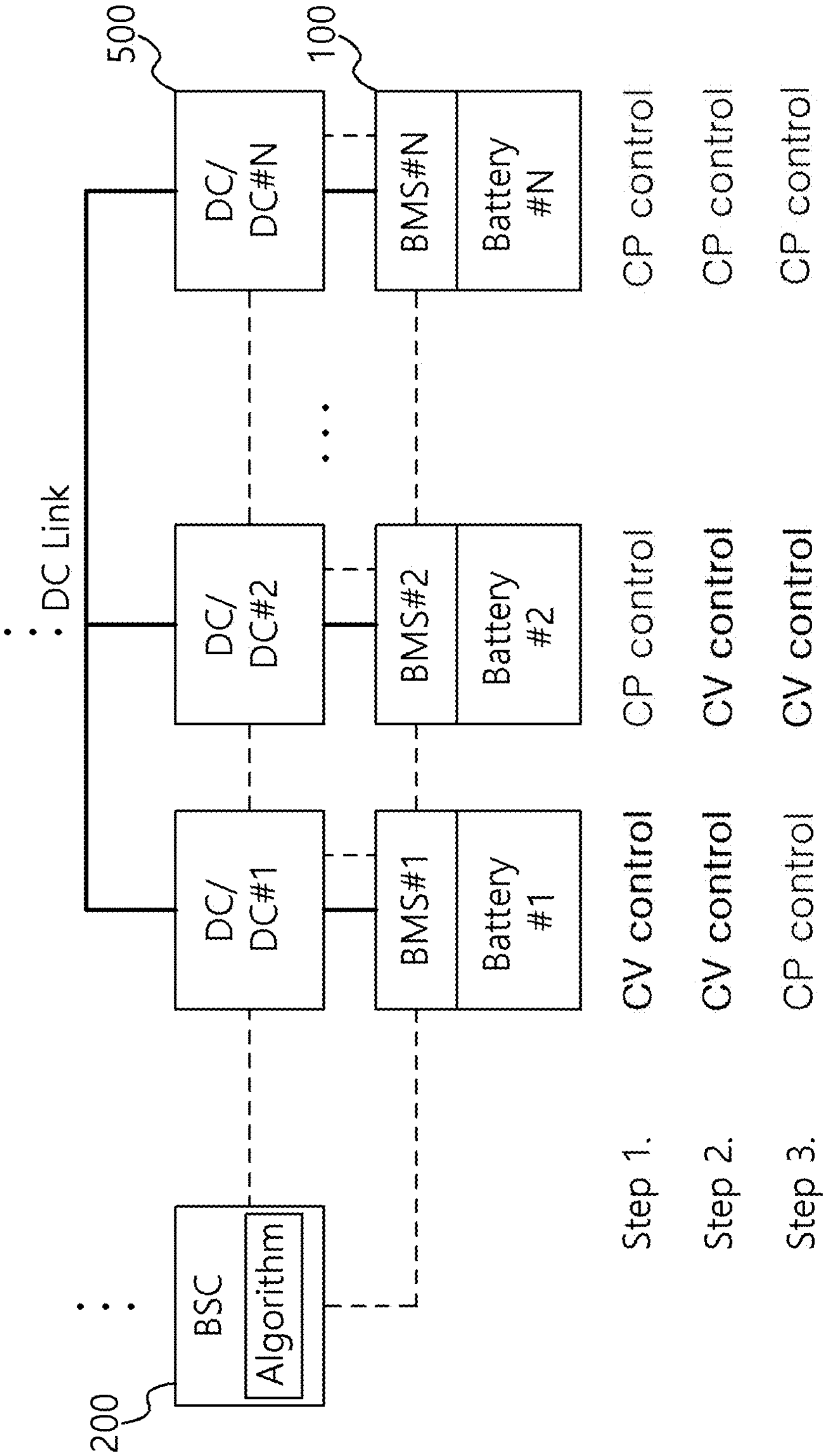
FIG. 2 is a conceptual diagram of a control method of an energy storage system according to embodiments of the present invention.

FIG. 2 is a conceptual diagram of a control method of an energy storage system according to embodiments of the present invention.

Various types of control method may be used to maintain the voltage of the DC link (i.e., the system voltage) in a constant state. In other words, a DC/DC converter and a PCS are a kind of power conversion devices that may perform Constant Voltage (CV) control, Constant Power (CP) control, Constant Current (CC) control, and droop control. Here, the droop control may refer to a control using a droop curve indicating a relationship between a DC link voltage and an output power of the DC/DC converter.

Typically, a PCS performs constant voltage (CV) control or constant power (CP) control. For example, assuming that a PCS performs CP control, a power management system (PMS) calculates an output reference of the PCS (a power value to be output by the PCS) and transmits it to the PCS as a command. In this instance, when the PCS that has received the command performs charging and discharging according to the CP control, the voltage at the DC link can be shaken by the charging and discharging of the PCS. Here, it is necessary to perform CV control in which a power converter maintains the voltage of the DC link at a constant level for stable control of the system.

However, as shown in FIG. 2, when an individual DC/DC converter is disposed and used for each battery pack, a plurality of DC/DC converters interworking with the DC link may exist. When two or more DC/DC converters continuously perform DC link voltage control, for example, a circulating current may be generated due to a voltage sensing error or the like. In other words, since two or more power converters cannot be completely identical in fact, a problem of sensing a same voltage into different values may occur, and thus a circulating current or a divergence of control occurs.

Accordingly, as shown in FIG. 2 according to the embodiments of the present invention, one DC/DC converter performs CV control. In step 1 of FIG. 2, a power converter for performing CV control is DC/DC converter 1 and all other DC/DC converters perform CP control.

Meanwhile, the CV control of the DC/DC converter can be performed without a problem if a SOC of a corresponding battery is in an appropriate boundary. However, when the SOC of the corresponding battery reaches a specific upper limit or a lower limit, the output of the DC/DC converter is also limited by this output limiting characteristic of the battery itself, and accordingly, it may be difficult to perform normal CV control.

Therefore, according to embodiments of the present invention, when the battery of the DC/DC converter performing CV control reaches the upper limit of a Soc region or the lower limit of the SOC region, a DC/DC converter connected to another battery may perform CV control.

Here, when a subject of CV control is changed from DC/DC converter 1 to DC/DC converter 2, in step 2, CV control is temporarily performed by both of the two DC/DC converters, thereby maintaining control of the DC link voltage at all times. In step 3 after step 2, control is completely transferred to DC/DC converter 2, only DC/DC converter 2 performs CV control, and DC/DC converter 1 performs CP mode control.

Figure 3:
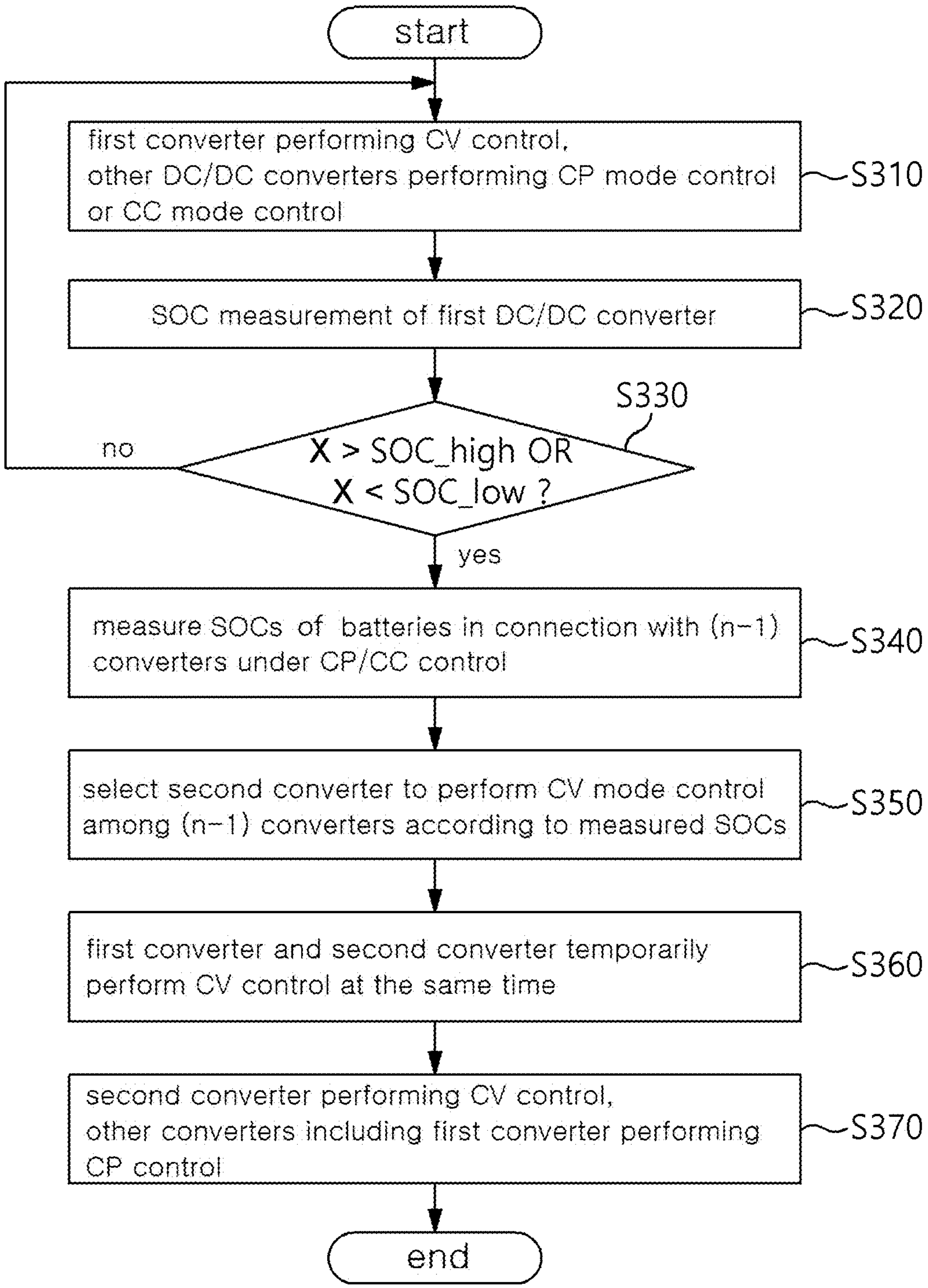
FIG. 3 is an operational flowchart of a method for controlling an energy storage system according to embodiments of the present invention.

FIG. 3 is an operational flowchart of a method for controlling an energy storage system according to embodiments of the present invention.

The control method shown in FIG. 3 describes how a controlling method of the DC/DC converter is changed from CV control to CP mode or CC mode control, or vice versa. The control method shown in FIG. 3 may be performed by a battery section controller. In other words, a subject of determining a control mode of a DC/DC converter is the battery section controller.

When the DC/DC converter performs CP mode or CC mode control, the BSC calculates an output reference of the DC/DC converter in consideration of a state of charge (SOC) of the battery and transmits it to the DC/DC converter, and the DC/DC converter may decide output value based on the output reference. That is, according to the present invention, active control is possible that determines the output by itself according to a state of the battery.

Referring to FIG. 3, in a power control method according to the present invention, one DC/DC converter among a plurality of DC/DC converters performs CV control on a DC link. Therefore, for example, if n DC/DC converters are disposed in the system and a first converter performs CV control, all of the rest DC/DC converters perform CP mode control or CC mode control (S310).

In this state, a SOC measurement for the first DC/DC converter performing CV mode control may be periodically performed (S320). When the measured SOC of the first DC/DC converter is within an appropriate range (NO in S330), the CV mode control by the first converter is continuously performed.

However, when the SOC of the first DC/DC converter is out of the appropriate range, that is, when the SOC of the first DC/DC converter is greater than an upper limit value (SOC_high) of a preset Soc range or less than a lower limit value (SOC_low) (S330 of Yes), it is necessary to change the subject of CV control. Specifically, the BSC may measure SOCs of batteries in connection with (n−1) converters under CP/CC control except for the first converter performing CV mode control among all n converters (S340). Then, the BSC may select a second converter to perform CV mode control among (n−1) converters according to the measured SOCs (S350).

Here, a procedure for selecting a new converter to perform CV mode control may be performed using Equations 1 and 2 below.

$$\text{Diff\_}n=\max\{(x-SOC\_low),(SOC\_\text{high}-x)\} \quad \text{[Equation 1]}$$

In equation 1, x is a SOC of a corresponding battery, SOC_high is the upper limit of a preset SOC range, and SOC_low is the lower limit of the preset SOC range. For a battery with a typical SOC, x will be a value greater than or equal to SOC_low and less than or equal to SOC_high (i.e., $0<\text{SOC\_low}<x<\text{SOC\_high}<100$).

$$\text{Next\_}CV\text{\_converter}=a\ DC/DC\ \text{converter with}\ \min\{\text{Diff\_1},\text{Diff2},\ldots,\text{Diff\_}n-1) \quad \text{[Equation 2]}$$

Through equation 1, a SOC deviation (Diff) of each battery, that is, the larger of the difference between the upper limit value or the lower limit value compared to the current SOC of a corresponding battery, may be calculated. In addition, a new DC/DC converter (Next_CV_converter) to perform CV control may be selected through equation 2. According to equation 2, a converter having an SOC of the minimum deviation, that is, a converter having a value at an intermediate position within a preset Soc range, may be selected as a converter suitable for performing the next CV control. As such, when the converter having the intermediate position value within a preset SOC range performs CV control, CV control can be maintained for the longest, and thus, a frequent control mode switching can be prevented.

The converter selection procedure usinge equations 1 and 2 can be useed not only when changing a subject to perform CV control during system operation, but also when selecting a DC/DC converter to perform initial CV mode control during an initial operation of the system. In other words, equations 1 and 2 may be used even when a first converter is selected in step S310, and in this instance, the SOC measurements may be done for all DC/DC converters in the system.

Meanwhile, when the second converter to perform CV control is selected, the first converter and the second converter temporarily perform CV control at the same time (S360), which is for stably maintaining the voltage of the DC link as mentioned above.

After a certain short period of time has elapsed, only the second converter performs CV control, and all other converters including the first converter perform CP mode or CC mode control (S370).

According to the embodiments of the present invention as described above, it is possible to stably control the DC link voltage in an energy storage system using a plurality of DC/DC converters.

In addition, the DC/DC converters, other than the DC/DC converter that performs CV control, perform CP control or CC control, so that the BSC can actively calculate an output reference of each battery based on a state of each battery.

In another aspect, in general, a power conversion system in an existing energy storage system that does not include a DC/DC converter is generally driven by a CP or CC control method. When a control method according to the embodiments of the present invention is applied to a battery system to which a DC/DC converter is applied, the power conversion system in the ESS may operate in the same manner as the method used in the existing system. In other words, according to the embodiments of the present invention, even if a DC/DC converter is used in the battery system, there is no need to change a software of the power conversion system, and thus the power conversion system can be used as it is previously used.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above example hardware device can be configured to operate as at least one software module in order to perform the embodiments of the present disclosure, and vice versa.

Some aspects of the present invention have been described above in the context of a device but may be described using a method corresponding thereto. Here, blocks or the device corresponds to operations of the method or characteristics of the operations of the method. Similarly, aspects of the present invention described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some embodiments, one or more of most important operations of the method may be performed by such a device.

While the example embodiments of the present invention and their advantages have been described in detail, it should be understood that various changes, substitutions and alterations may be made herein without departing from the scope of the invention.

The invention claimed is:

1. An energy storage system, comprising:

a plurality of power converters configured to perform a DC/DC conversion for a plurality of battery racks, respectively, the plurality of power converters including:

a first power converter connected to a first battery rack among the plurality of battery racks; and a plurality of other power converters connected respectively to a plurality of other battery racks, other than the first battery rack, among the plurality of battery racks;

a power conversion system (PCS) configured to perform power conversion between the plurality of power converters and a power grid; and a battery section controller interworking with the plurality of power converters and the power conversion system, wherein the battery section controller is configured:

to control the first power converter to perform a constant voltage (CV) mode control for maintaining a voltage of a DC link at a constant level, to check a state of the first battery rack, and to select a second power converter from among the plurality of other power converters to perform the CV mode control for the DC link according to the state of the first battery rack and states of the plurality of other battery racks.

2. The energy storage system of claim 1, wherein the battery section controller is further configured to control the plurality of other power converters to perform a constant power (CP) mode control or a constant current (CC) mode control.

3. The energy storage system of claim 1, wherein the battery section controller is further configured to;

stop the first power converter from performing the CV mode control for the DC link based on a state of charge (SOC) of the first battery rack; and control the second power converter, selected from among the plurality of other power converters based on SOCs of the plurality of other battery racks, to perform the CV mode control for the DC link.

4. The energy storage system of claim 3, wherein the battery section controller is further configured to control the first power converter and the second power converter to simultaneously perform the CV mode control for the DC link temporarily, before stopping the first power converter from performing the CV mode control for the DC link and causing the second power converter to continue performing the CV mode control for the DC link.

5. The energy storage system of claim 3, wherein the battery section controller is configured to select as the second power converter one of the plurality of other power converters that is connected to a battery rack with an SOC nearest a midpoint between a lower limit and an upper limit of a preset range of SOC among the SOCs of the plurality of other battery racks.

6. The energy storage system of claim 1, wherein the battery section controller is further configured to:

determine whether a state of charge (SOC) of the first battery rack is greater than an upper limit or lower than a lower limit of a preset range of SOC; and if the SOC of the first battery rack is greater than the upper limit or lower than the lower limit of the preset range of SOC, then determine SOCs of the plurality of other battery racks and select the second power converter from among the plurality of other power converters, based on the SOCs of the plurality of other battery racks, to perform the CV mode control for the DC link.

7. The energy storage system of claim 1, wherein the DC link is a link between the plurality of power converters and the power conversion system (PCS).

8. A control method of an energy storage system including a plurality of power converters configured to perform a DC/DC conversion respectively for a plurality of battery racks, the plurality of power converters including a first power converter connected to a first battery rack among the plurality of battery racks and including a plurality of other power converters connected respectively to a plurality of other battery racks other than the first battery rack among the plurality of battery racks, the method comprising:

controlling the first power converter to perform a constant voltage (CV) mode control for maintaining a voltage of a DC link at a constant level;

checking a state of the first battery rack; and selecting a second power converter from among the plurality of other power converters to perform the CV mode control for the DC link according to the state of the first battery rack and states of the plurality of other battery racks.

9. The control method of claim 8, further comprising:

controlling the plurality of other power converters to perform a constant power (CP) mode control or a constant current (CC) mode control.

10. The control method of claim 8, wherein the selecting of the second power converter includes:

stopping the first power converter from performing the CV mode control for the DC link based on a state of charge (SOC) of the first battery rack; and controlling the second power converter, selected from among the plurality of other power converters based on SOCs of the plurality of other battery racks, to perform the CV mode control for the DC link.

11. The control method of claim 10, wherein the selecting of the second power converter further includes:

controlling the first power converter and the second power converter to simultaneously perform the CV mode control for the DC link temporarily; and then stopping the first power converter from performing the CV mode control for the DC link and causing the second power converter to continue performing the CV mode control of for the DC link.

12. The control method of claim 10, wherein the selecting of the second power converter further includes:

selecting as the second power converter one of the plurality of other power converters that is connected to a battery rack with an SOC nearest a midpoint between a lower limit and an upper limit of a preset range of SOC among the SOCs of the plurality of other battery racks.

13. The control method of claim 8, wherein;

the checking of the state of the first battery rack includes determining whether a state of charge (SOC) of the first battery rack is greater than an upper limit or lower than a lower limit of a preset range of SOC; and the selecting of the second power converter includes, if the SOC of the first battery rack is greater than the upper limit or lower than the lower limit of the preset range of SOC:

determining SOCs of the plurality of other battery racks; and selecting the second power converter from among the plurality of other power converters, based on the SOCs of the plurality of other battery racks, to perform the CV mode control for the DC link.

14. The control method of claim 8, wherein the DC link is a link between the plurality of power converters and a power conversion system (PCS) that is configured to perform an AC/DC conversion between the plurality of power converters and a power grid.

15. A battery section controller in an energy storage system including a plurality of power converters configured to perform a DC/DC conversion respectively for a plurality of battery racks, the plurality of power converters including a first power converter connected to a first battery rack among the plurality of battery racks and including a plurality of other power converters connected respectively to a plurality of other battery racks other than the first battery rack among the plurality of battery racks, and the battery section controller being in connection with the plurality of power converters, the battery section controller comprising:

at least one processor; and a memory configured to store at least one instruction executed by the at least one processor, wherein the at least one instruction includes:

an instruction to control the first power converter to perform a constant voltage (CV) mode control for maintaining a voltage of a DC link at a constant level;

an instruction to check a state of the first battery rack; and an instruction to select a second power converter from among the plurality of other power converters to perform the CV mode control for the DC link according to the state of the first battery rack and states of the plurality of other battery racks.

16. The battery section controller of claim 15, wherein the at least one instruction further includes:

an instruction to control the plurality of other power converters to perform a constant power (CP) mode control or a constant current (CC) mode control.

17. The battery section controller of claim 15, wherein the at least one instruction further includes:

an instruction to stop the first power converter from performing the CV mode control for the DC link based on a state of charge (SOC) of the first battery rack; and an instruction to control the second power converter, selected from among the plurality of other power converters based on SOCs of the plurality of other battery racks, to perform the CV mode control for the DC link.

18. The battery section controller of claim 15, wherein the at least one instruction further includes:

an instruction to control the first power converter and the second power converter to simultaneously perform the CV mode control for the DC link temporarily; and an instruction to stop the first power converter from performing the CV mode control for the DC link; and an instruction to cause the second power converter to continue performing the CV mode control of for the DC link.

19. The battery section controller of claim 15, wherein the instruction to select the second power converter includes:

an instruction to select as the second power converter one of the plurality of other power converters that is connected to a battery rack with a state of charge (SOC) nearest a midpoint between a lower limit and an upper limit of a preset range of SOC among SOCs of the plurality of other battery racks.

20. The battery section controller of claim 15, wherein:

the instruction to check the state of the first battery rack includes an instruction to determine whether a state of charge (SOC) of the first battery rack is greater than an upper limit or lower than a lower limit of a preset range of SOC; and the instruction to select of the second power converter includes an instruction, if the SOC of the first battery rack is greater than the upper limit or lower than the lower limit of the preset range of SOC, to determine SOCs of the plurality of other battery racks and to select the second power converter from among the plurality of other power converters based on the SOCs of the plurality of other battery racks.

* * * * *